2,812,337
Patented Nov. 5, 1957

2,812,337

PAINTS AND METHODS OF MANUFACTURING SAME

Karl Culemeyer, Hamburg-Langenfelde, Germany, assignor to Willy Spangenberg & Co., Hamburg-Eidelstedt, Germany, a company of Germany No Drawing. Original application September 9, 1950, Serial No. 184,115. Divided and this application January 16, 1952, Serial No. 266,793

Claims priority, application Germany September 10, 1949

11 Claims. (Cl. 260—404)

This invention relates to paints, paint bases and methods of manufacturing the same. More particularly it pertains to the preparation of substances adapted for utilization as paint bases and for affording improved paint compositions, embracing within its purview the novel products obtained. In its preferred aspects, the procedural features and attainable products of the invention are effected through the adaptation of tallic or tall oil. The present application is a division of my co-pending application Serial No. 184,115 filed September 9, 1950, which has matured to Patent No. 2,781,386.

The term "tallic oil" is synonymously referred to herein as tall oil. It will be understood that the said tallic or tall oil is intended to designate throughout this specification the liquid resinous type substance which is referred to as waste product in the manufacture of cellulose from pine wood.

An object of the present invention is to produce quickly drying paint bases or paints of high weather resistance.

Another object is to improve the drying qualities of paint bases or paints containing tallic oil fatty esters, the said drying characteristics being otherwise generally insufficient due to the absence of linolenic acid and the presence of a high content of oleic acid in the fatty acids.

A further object is to increase the molecular size of tallic oil fatty acid esters of increased molecular size and manifesting enhanced drying qualities of paint bases or paints containing these substances.

An important object is to provide paints which will not yellow with age.

An additional object is the provision of paints or paint bases derived from a fatty acids containing composition which is substantially free of linolenic acid, whereby such paints will not yellow or tarnish with age.

Another object is the provision of paints which afford increased waterproof characteristics and resistance to inclement weather.

Other objects of the present invention will become apparent in the course of the following description presenting the features and details of the invention by way of illustration and not limitation.

In accomplishing the objects of the present invention it was found desirable to convert practically pure fatty acids and/or pure resin acids of tallic or tall oil, obtained for example in the course of high vacuum distillation of raw tallic oil into predetermined types of esters.

Particularly good results are obtained when polyhydric alcohol esters of pure tallic oil fatty acids are converted with di- or polyisocyanates by a polyaddition reaction. It was found that it is advantageous to proceed by producing partial esters of these fatty acids which contain less than one free hydroxyl group to one ester molecule, such as an ester wherein three ester molecules have one free hydroxyl group. Desirably the tallic oil fatty acids are esterified with polyvalent alcohols to produce a partial ester product, as aforesaid, having free hydroxyl groups, and the ester product is reacted with an amount of polyisocyanate adapted to provide isocyanate groups corresponding in number with the free hydroxyl groups of the ester product. If these esters are converted with an equivalent amount of a di- or polyisocyanate, then the resulting oil-like product will afford optimum drying qualities and superior properties with respect to water and light resistance. It is advantageous to use small amounts of polyisocyanates, for example, a diisocyanate, such as p-toluylene-diisocyanate, such amounts being smaller than those corresponding to the stoichiometric relationship of one molecule diisocyanate to two molecules ester, each with a free hydroxyl group, since in addition to the low costs of the process, the danger of gelatinization during conversion with diisocyanate, as a result of unduly progressed polyaddition is considerably diminished, and a yellowing which often takes place when large amounts of diisocyanate are used is avoided entirely.

It was found advantageous to use di- or triisocyanates for combination purposes. Particularly desirable results have been obtained by the use of less than or not to exceed approximately six percent by weight of di- or triisocyanate related to the ester. Thus lacquer oils were produced which after being siccativated and diluted in the usual manner produce varnishes of excellent weather and water resistance, and upon being rubbed up with white pigments, produce pure white paints which will not yellow, despite being exposed to adverse weather conditions.

Pursuant to the latitudes of the invention, it is possible to produce excellent paint bases or paints from esters containing free hydroxyl groups, of tallic oil fatty acids, tallic oil resin acids and/or drying or half-drying oils reacted with the polyvalent alcohols, the esterification or transesterification being carried out to an extent such that the esters have a hydroxyl number within the range of about 5 to 65, and whereby these partial esters are coupled with polyisocyanates, i. e., isocyanates with more than one cyanate group in the molecule. The present invention also includes adducts capable of splitting, which are so-called masked isocyanates.

It was found that for the manufacture of partial esters it is advantageous to employ tallic oil, or its components, such as tallic oil distillates, pure tallic oil fatty acids, pure tallic oil resin acids, esters thereof, or condensation or polymerization products, or mixtures of the latter.

The invention will appear more clearly from the following example, given solely by way of illustration and not by way of limitation.

Example 1000 kilograms pure tall oil fatty acids with a content of 96% oleic acid and linoleic acid are esterified with 140 kilograms pentaerythritol at 280° C. at low pressure, starting with an acid value of 30, until the acid value has reached 8. Then the product is cooled to 120° C. and reacted with 37 kilograms p-toluylene-diisocyanate. This temperature is maintained for two hours while the substances are stirred, and thereupon the reaction product is siccativated and diluted in the usual manner. This product results in a well drying paint of high resistance against adverse weather and water which upon being rubbed up with white pigments produces pure white colors which upon application do not chalk off or become yellow.

Thus in accordance with the present invention, tallic oil, otherwise known as tall oil, is utilized in producing an enhanced coating composition of a type manifesting optimum attributes as a paint base or paint composition. As a summary indication of a preferred embodiment or adaptation thereof, tall oil, desirably in a substantially pure state, such as that obtainable by the high vacuum distillation of raw tall oil, is reacted with polyhydric alcohol, the reagents being in regulated proportion to afford a partially esterified product having free hydroxyl groups, the content of the latter being less than one free hydroxyl group to one ester molecule, with the said esterified product desirably having a hydroxyl number within the approximate range of 5 to 65. The aforesaid partially esterified product is in turn reacted with a relatively small amount of polyisocyanate, below that which may effect gelation of the ester product. Desirably the quantity of polyisocyanate, based on the weight of the ester product, is sufficient to provide isocyanate groups substantially corresponding with the number of free hydroxyl groups in the partially esterified product. Indicative of an effective molar relationship is an amount of polyisocyanate below that corresponding to the stoichiometric relationship of one molecule of the isocyanate to two molecules of the ester product.

The ultimate product attained, comprising that resulting from the reaction of the aforesaid tall oil esterified polyhydric alcohol with a polyisocyanate in accordance with the present invention, affords enhanced color fastness and water resistance, as well as optimum drying characteristics, as a coating composition. In addition, an improved stability is afforded with respect to premature gelatinization and in connection with weather resistance generally.

While the invention herein has been illustratively described in accordance with desirable and preferred procedural adaptations, it will be apparent that many changes may be made in the details and features thereof without departing from the essence or latitude of the invention as defined in the following claims.

What is claimed is:

1. The process of manufacturing a drying paint base, which comprises esterifying substantially pure tall oil fatty acids with a polyhydric alcohol to produce a polyhydric alcohol ester product which contains less than one free hydroxyl group to one ester molecule and having a hydroxyl number within the approximate range of 5 to 65, and reacting the ester product with a polyisocyanate in an amount less than that corresponding to the stoichiometric relationship of one molecule of the polyisocyanate to two ester molecules and in sufficient quantity to provide isocyanate groups substantially corresponding with the number of free hydroxyl groups in the ester product.

2. The process as in claim 1, wherein the polyisocyanate is a substance from the group consisting of diisocyanates and triisocyanates.

3. The process as in claim 2, wherein the amount of isocyanate is below 6% by weight of the ester product.

4. The process as in claim 2, wherein the polyhydric alcohol ester product comprises three ester molecules to one free hydroxyl group.

5. The process as in claim 3, wherein the tall oil fatty acids comprise a content of approximately 96% oleic acid and linoleic acid.

6. A process for preparing a drying paint composition comprising the process as in claim 3, wherein the reaction product is siccativated, diluted to a desirable paint viscosity and admixed with a predetermined pigment.

7. The process as in claim 5, wherein the polyhydric alcohol is pentaerythritol and the diisocyanate is p-toluylene-diisocyanate.

8. The process as in claim 7, wherein the tall oil fatty acids are esterified with the pentaerythritol at a temperature of approximately 280° C. and at reduced pressure, until the initial acid value of 30 is reduced to an acid value of approximately 8, the resultant esters being then cooled to approximately 120° C., and reacted with the p-toluylene-diisocyanate for approximately two hours, the reagents being reacted in the relative proportions conforming with the relationship of 1000 kilograms of tall oil fatty acids and 37 kilograms of p-toluylene-diisocyanate.

9. A process for preparing a drying paint composition comprising the process as in claim 8, wherein the reaction product is siccativated, diluted to a desirable paint viscosity, and admixed with a white pigment.

10. The product resulting from the process of claim 5.

11. The product resulting from the process of claim 7.

References Cited in the file of this patent

UNITED STATES PATENTS

| 2,214,784 | Wayne | Sept. 17, 1940 |
| 2,358,475 | Pratt et al. | Sept. 19, 1944 |
| 2,365,300 | Segessemann | Dec. 19, 1944 |
| 2,523,309 | Kester | Sept. 29, 1950 |

OTHER REFERENCES

Bailey: Oil and Fat Products, Interscience Publishing, Inc., New York city, 1945, pages 380–381.

Official Digest, No. 251, December 1945, pages 490–492.

Bayer: Modern Plastics, June 1947, pages 149–152.